United States Patent
Matsui

(10) Patent No.: US 8,954,380 B2
(45) Date of Patent: Feb. 10, 2015

(54) APPLICATION MANAGEMENT METHOD AND INFORMATION PROCESSING APPARATUS

(75) Inventor: Yuma Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 12/624,933

(22) Filed: Nov. 24, 2009

(65) Prior Publication Data

US 2010/0070468 A1    Mar. 18, 2010

Related U.S. Application Data

(63) Continuation of application No. PCT/JP2008/057809, filed on Apr. 23, 2008.

(30) Foreign Application Priority Data

Jun. 5, 2007   (JP) .................................. 2007-149558

(51) Int. Cl.
G06F 9/46      (2006.01)
G06F 17/30     (2006.01)
G06F 9/44      (2006.01)

(52) U.S. Cl.
CPC ....................................... *G06F 8/68* (2013.01)
USPC ................... 707/609; 718/100; 707/E17.009

(58) Field of Classification Search
CPC combination set(s) only.
See application file for complete search history.

(56) References Cited

U.S. PATENT DOCUMENTS

| | | | |
|---|---|---|---|
| 6,697,824 B1* | 2/2004 | Bowman-Amuah | 709/229 |
| 6,711,739 B1* | 3/2004 | Kutcher | 718/1 |
| 7,702,766 B2* | 4/2010 | Weir et al. | 709/223 |
| 2002/0087734 A1* | 7/2002 | Marshall et al. | 709/310 |
| 2005/0223101 A1* | 10/2005 | Hayes | 709/228 |
| 2005/0226641 A1 | 10/2005 | Ando et al. | 399/8 |
| 2007/0234349 A1 | 10/2007 | Ushiku | 717/174 |
| 2008/0189638 A1* | 8/2008 | Mody et al. | 715/771 |
| 2008/0201705 A1* | 8/2008 | Wookey | 717/175 |
| 2009/0172769 A1* | 7/2009 | Bobak et al. | 726/1 |

FOREIGN PATENT DOCUMENTS

| | | | |
|---|---|---|---|
| JP | 2005-269619 | 9/2005 | G03G 21/00 |
| JP | 2006-323500 | 11/2006 | |

* cited by examiner

*Primary Examiner* — Shyue Jiunn Hwa

(74) *Attorney, Agent, or Firm* — Fitzpatrick, Cella, Harper & Scinto

(57) ABSTRACT

An information processing apparatus includes an application management unit which manages the state of an application, and a package management unit which manages dependence relationship information between the package of an arbitrary application and the package of another application. The package is a group of files to be used to execute the application. The package management unit processes the application based on the dependence relationship information. The application management unit manages the state of the application in accordance with a notification from the package management unit.

13 Claims, 11 Drawing Sheets

F I G. 3
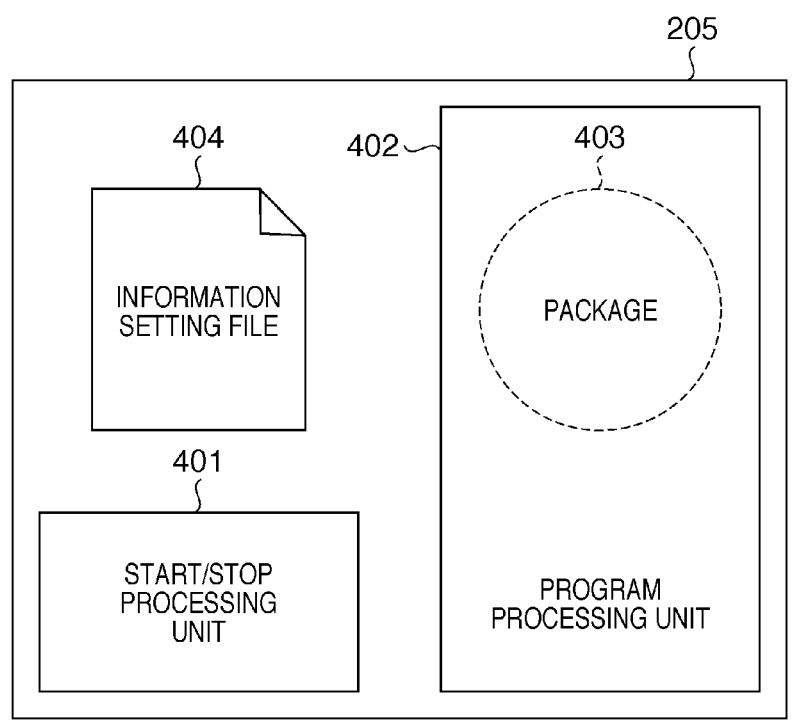

F I G. 8
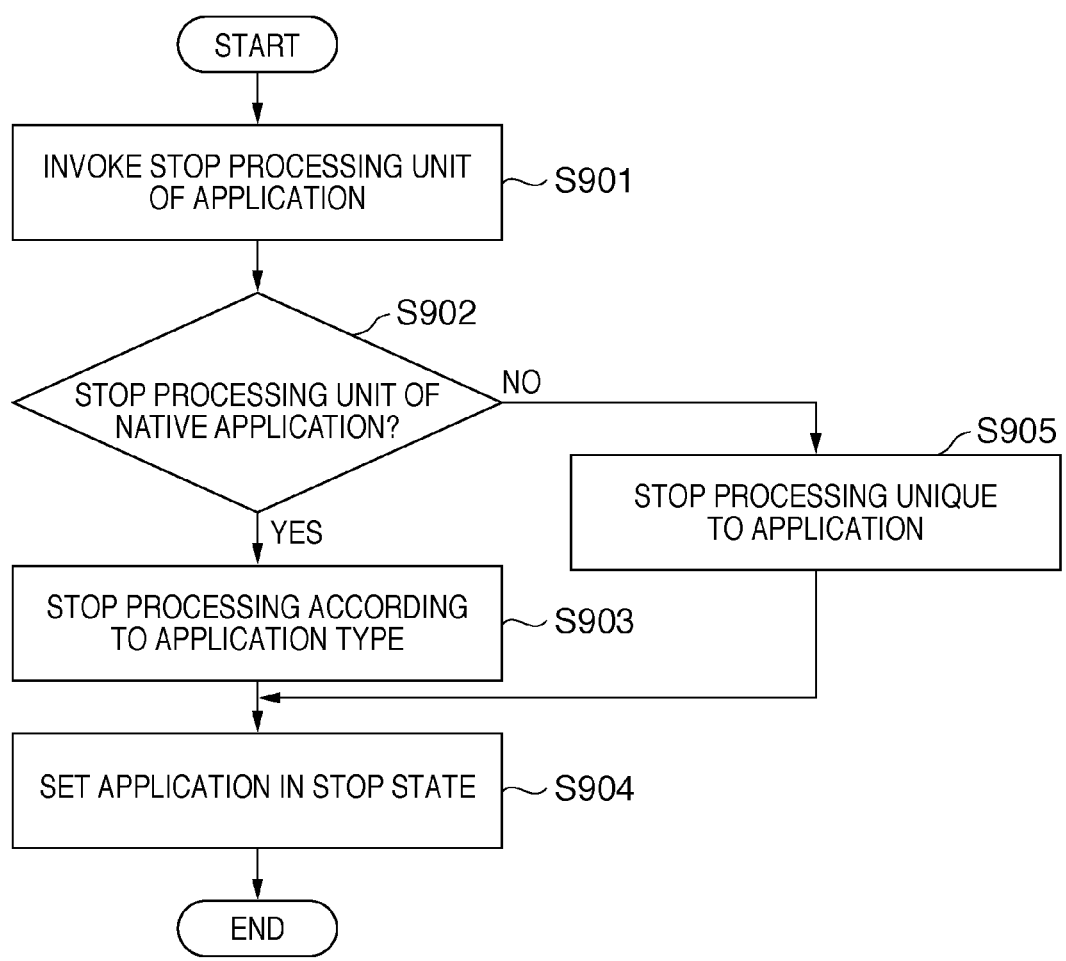

APPLICATION MANAGEMENT METHOD AND INFORMATION PROCESSING APPARATUS

CROSS REFERENCE TO RELATED APPLICATIONS

This application is a continuation of International Application No. PCT/JP2008/057809, filed Apr. 23, 2008, which claims the benefit of Japanese Patent Application No. 2007-149558, filed Jun. 5, 2007.

TECHNICAL FIELD

The present invention relates to an application management method and an information processing apparatus.

BACKGROUND ART

Conventionally, a technique of managing a plurality of applications running on a process is known (e.g., patent reference 1). In addition, a technique of aggregating and operating a plurality of application management frameworks is known (e.g., patent reference 2).

Patent reference 1: Japanese Patent Laid-Open No. 2005-269619
Patent reference 2: Japanese Patent Laid-Open No. 2006-323500

DISCLOSURE OF INVENTION

Problems that the Invention is to Solve

However, it is occasionally necessary to systematically manage a plurality of applications in different execution environments from a single application management framework. The plurality of applications include, for example, an application which runs on a virtual machine process, an application directly executed as a process on the operating system, and an application which runs via a Web application server process. No mechanism has conventionally been implemented to enable a user to unify handling of the plurality of applications. In particular, there is no implemented mechanism for managing a native application which executes a process directly on the operating system.

It is an object of the present invention to make it possible to systematically manage the states of applications independently of their execution environments by considering the dependence relationship of packages each including files to be used to execute the applications.

Means of Solving the Problems

According to the present invention, there is provided an application management method in an information processing apparatus including an application management unit that manages a state of an application, and a package management unit that manages dependence relationship information between a package of an arbitrary application and a package of another application, the package being a group of files to be used to execute the application, the method comprising: a processing step of causing the package management unit to process the application based on the dependence relationship information; and a management step of causing the application management unit to manage the state of the application in accordance with a notification from the package management unit.

Effect of the Invention

According to the present invention, it is possible to systematically manage the states of applications independently of their execution environments.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a block diagram showing the internal arrangement of a management unit application 205;

FIG. 8 is a flowchart illustrating an example of management unit application stop processing;

BEST MODE FOR CARRYING OUT THE INVENTION

An embodiment of the present invention will now be described with reference to the accompanying drawings.

Figure 1:
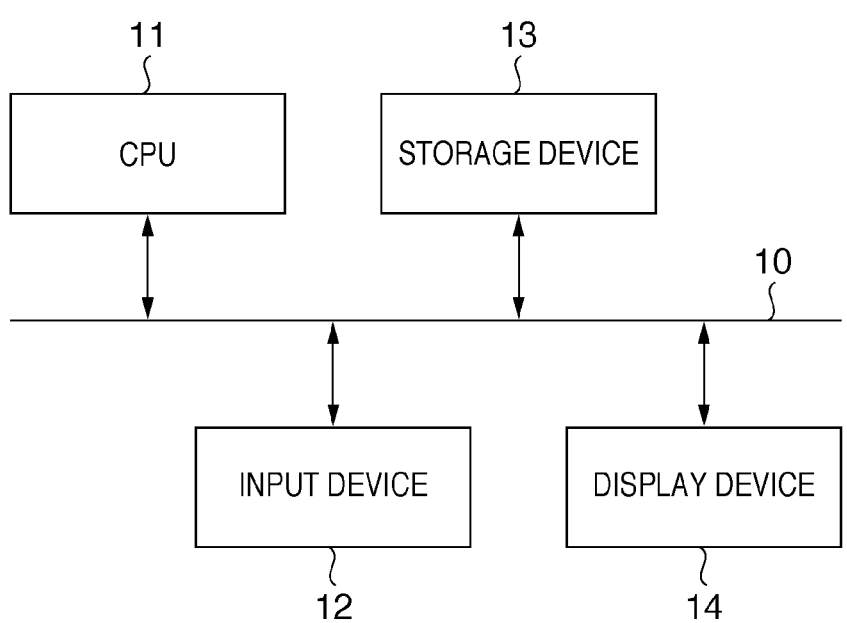
FIG. 1 is a block diagram showing an example of the hardware configuration of an information processing apparatus.

FIG. 1 is a block diagram showing an example of the hardware configuration of an information processing apparatus (computer). As shown in FIG. 1, the information processing apparatus includes a CPU 11 as a hardware configuration. The CPU 11 performs processing based on programs stored in a storage device 13 and corresponding to applications, frameworks, program execution environments, and the like to be described later, thereby implementing functions or flowcharts to be described later.

An input device 12, the storage device 13, and a display device 14 are connected to the CPU 11 via a bus 10. The storage device 13 is formed from, for example, a ROM, RAM, or hard disk device and stores not only the above-described programs but also data and the like to be used in processing based on the programs. The display device 14 is a display for displaying, for example, a window. The input device 12 includes a keyboard and/or a mouse for, for example, inputting information.

Figure 2:
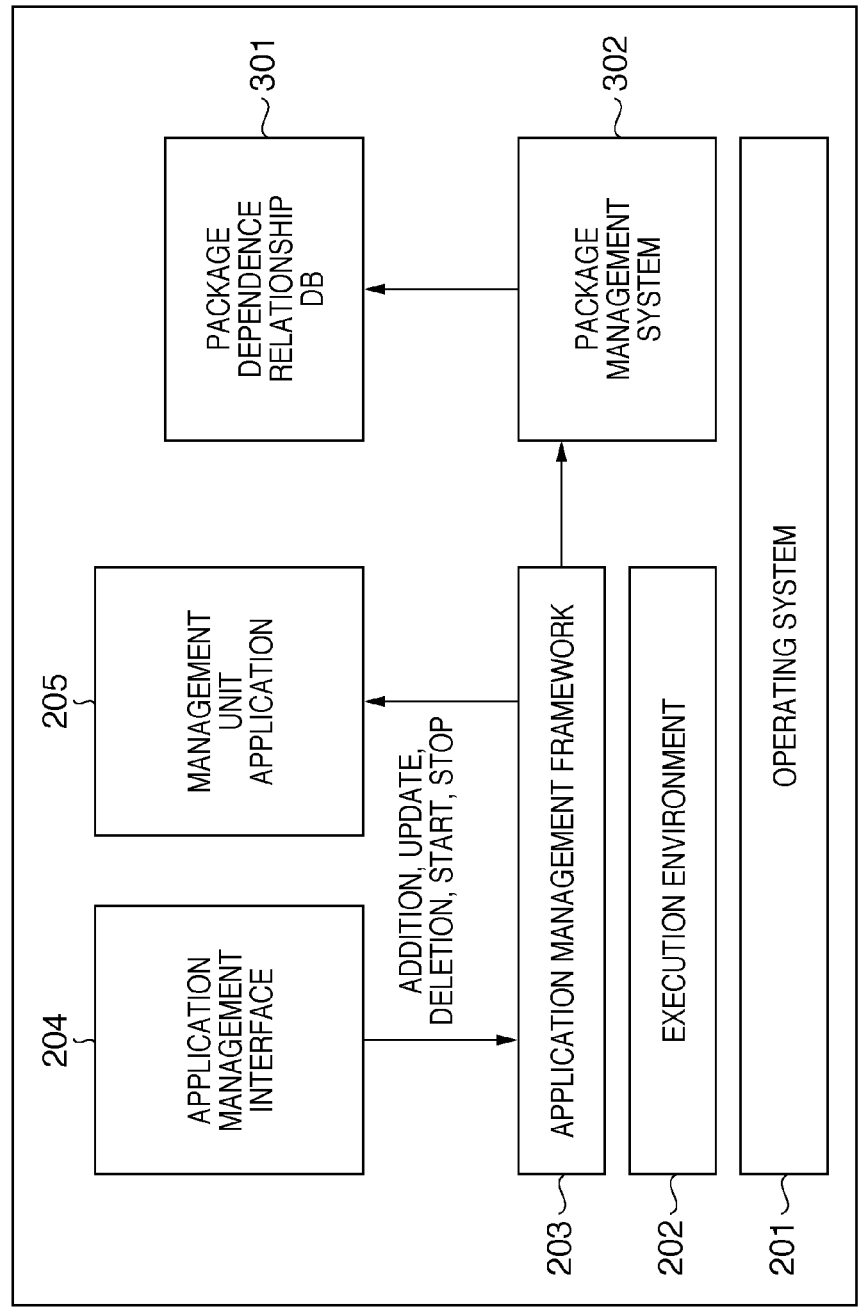
FIG. 2 is a block diagram showing an example of the functional arrangement of an application management system in the information processing apparatus.

The functional arrangement of an application management system in the information processing apparatus will be explained next with reference to FIG. 2. FIG. 2 is a block diagram showing an example of the functional arrangement of the application management system in the information processing apparatus. This functional arrangement is implemented by causing the CPU 11 to execute programs read out from a storage medium.

An operating system 201 is software which is the basis of the entire system. An execution environment 202 is software which is in itself a process such as a virtual machine on the operating system 201 but also provides an environment to run an application on itself. An application management framework 203 is software which is located between an application (management unit application 205) and the program execution environment 202 to provide a function of managing the operation state of the application of each management unit.

An application management interface 204 is an application which runs on the application management framework 203 and provides a front end function. The management unit application 205 is an application of each unit (management unit) whose state is managed by the application management framework 203.

A package management system 302 is software usable from the application management framework 203. The package management system 302 solves the dependence relationship between packages by referring to a package dependence relationship DB 301 and expands the packages on the file system. A package indicates a single file in which files necessary for, for example, execution of an application are brought together. The package management system 302 runs on the operating system 201.

The package dependence relationship DB 301 is a database which stores the information of the dependence relationship between packages. The dependence relationship between packages is a relationship like "a package A requires a package B and a package C as an assumption of the operation" managed by the package management system 302.

In the application management system, the application management framework 203 and the package management system 302 operate cooperatively via the packages. This makes it possible to handle applications of various kinds of execution environments.

FIG. 3 is a block diagram showing the internal arrangement of the management unit application 205.

A start/stop processing unit 401 executes start processing and stop processing when the management unit application 205 has received start and stop instructions from the application management framework 203. A program processing unit 402 is a (processing execution) program which executes processing in the running state of the management unit application 205. The processing in the running state can be either processing executed on the execution environment 202 or processing executed on the operating system 201.

Figure 4:
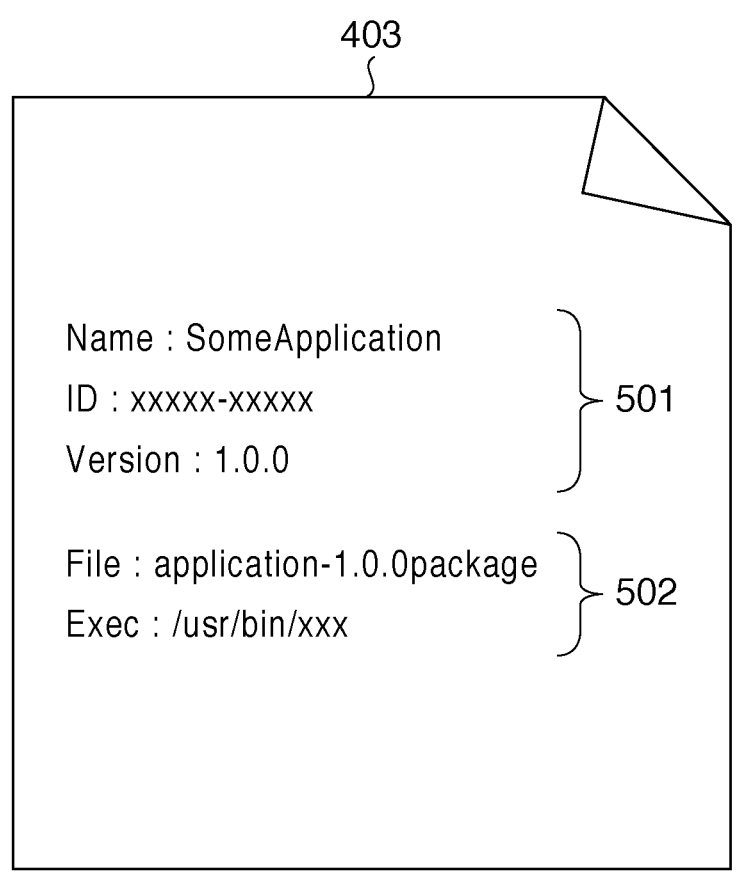
FIG. 4 is a view showing an example of a package 403.

When the management unit application 205 uses the package management system 302, the program processing unit 402 can include a package 403 in which files necessary for execution are put together. An example of the package 403 is shown in FIG. 4 to be described later. An information setting file 404 of the management unit application 205 is a file which describes the user setting information of the management unit application 205 and the like.

FIG. 4 is a view showing an example of the package 403. The package 403 includes a set item 501 independent of the application execution environment, and a set item 502 depending on the application execution environment.

The set item 501 independent of the application execution environment is a set item independent of the application execution environment such as the name, ID, and version of the management unit application.

The set item 502 depending on the application execution environment is a set item depending on the application execution environment such as a designation of a package file name and a designation of a file to be executed as a process. Note that the set item 502 depending on the application execution environment is also an item to be used to determine the type of the management unit application.

For example, the set item 502 of the package 403 in FIG. 4 describes information representing that the program processing unit 402 includes a package (package file) named application-1.0.0. package. The set item 502 of the package 403 in FIG. 4 also describes information representing that an executable file /usr/bin/xxx is executed as a process. Hence, the application management framework 203 can determine that the management unit application is a native application which executes a process directly on the operating system 201.

Figure 5:
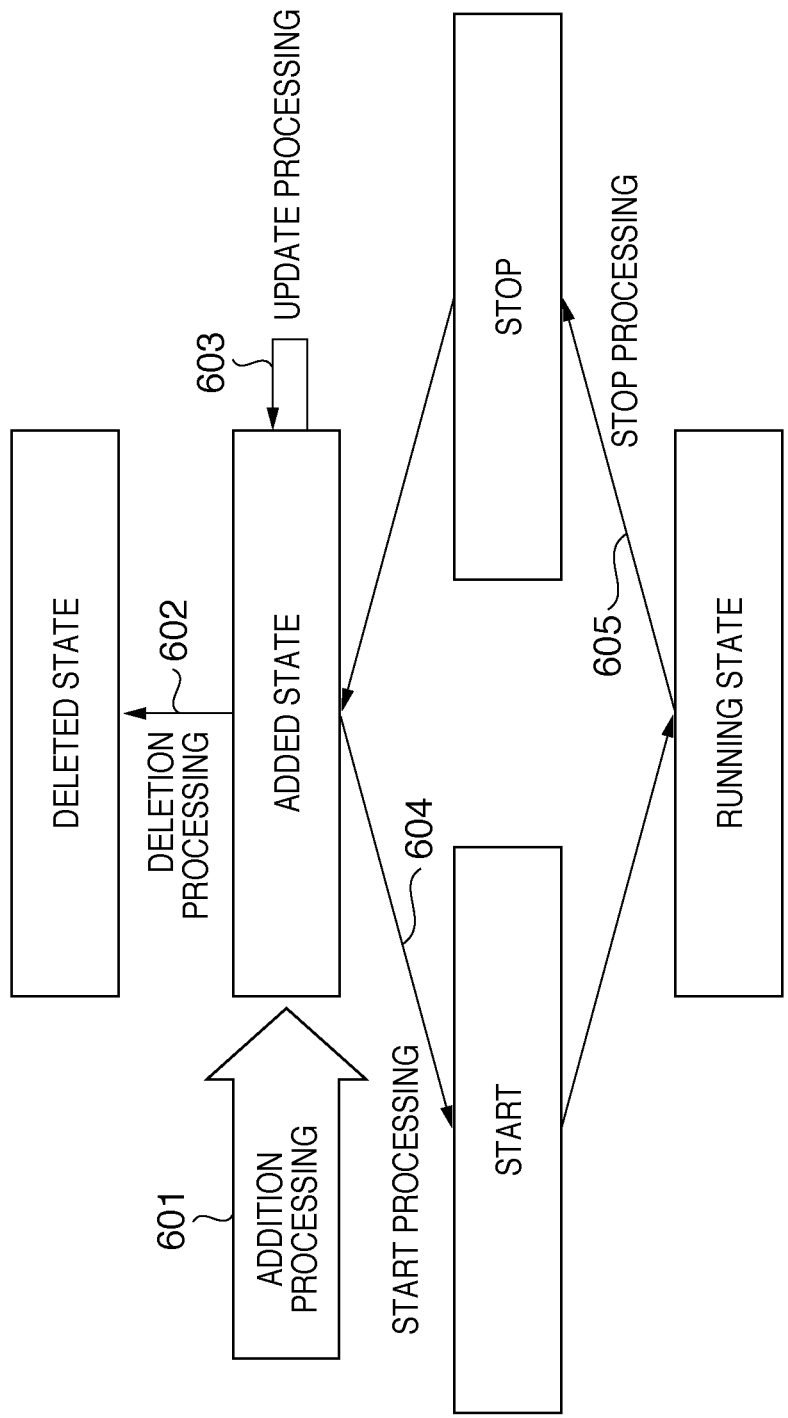
FIG. 5 is a view showing an example of the state transition of the management unit application.

FIG. 5 is a view showing an example of the state transition of the management unit application.

When a management unit application is added on the application management framework 203 by management unit application addition processing 601, the state of the management unit application changes to an added state. When the management unit application in the added state is deleted from the application management framework 203 by management unit application deletion processing 602, the state of the management unit application changes to a deleted state.

When the management unit application in the added state is updated on the application management framework 203 by management unit application update processing 603, the state of the updated management unit application remains the added state. When the management unit application in the added state is started on the application management framework 203 by management unit application start processing 604, the state of the management unit application changes to a start state and then to a running state.

When the management unit application in the running state is stopped by management unit application stop processing 605, the state of the management unit application changes to a stop state and then returns to the added state.

The procedure of each processing concerning the state transition of the management unit application will be described below using flowcharts.

Figure 6:
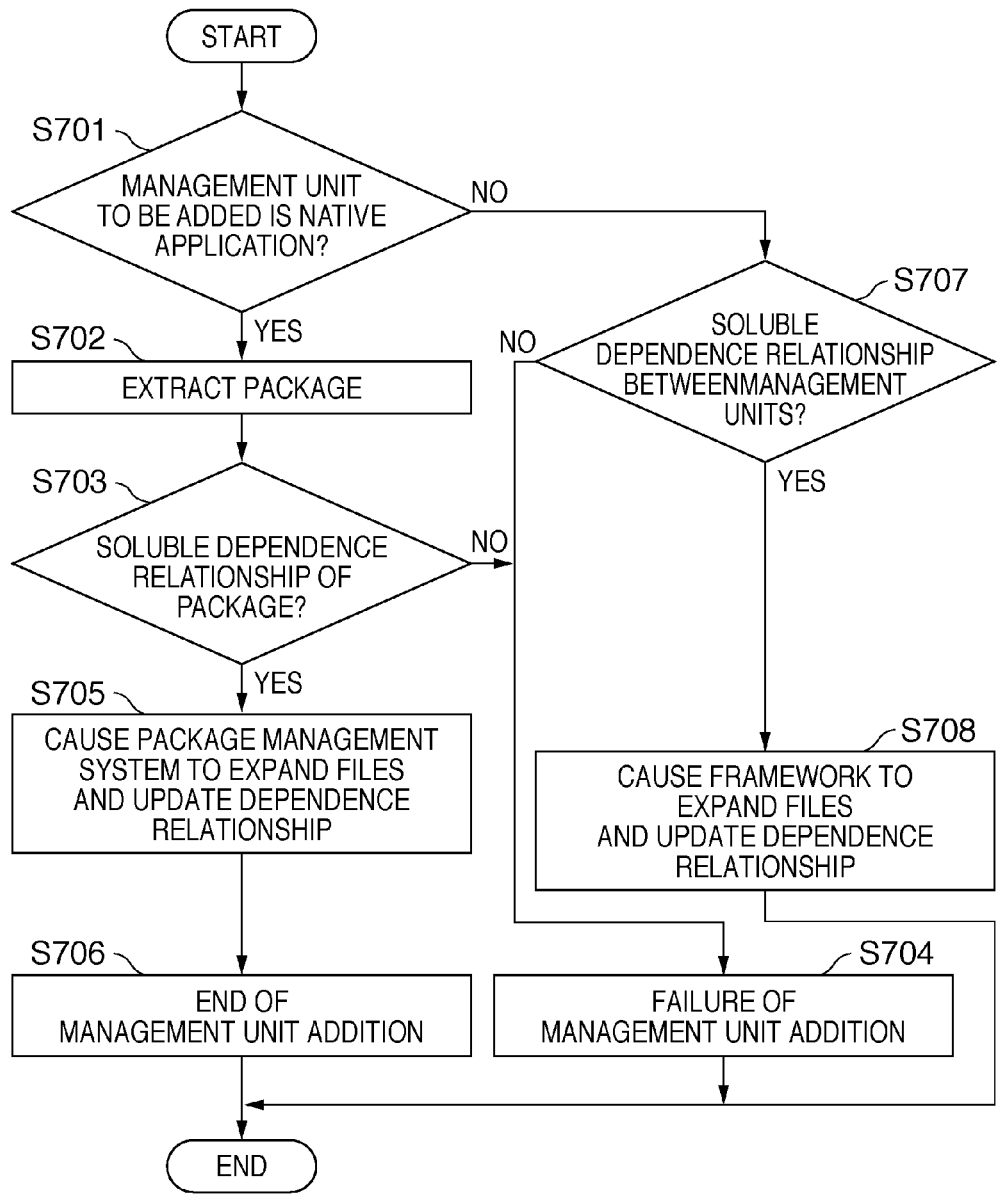
FIG. 6 is a flowchart illustrating an example of management unit application addition processing.

FIG. 6 is a flowchart illustrating an example of the management unit application addition processing 601 in FIG. 5. If operation information input from the application management interface 204 concerns addition of an application, the application management framework 203 on the execution environment 202 executes the following processing.

In step S701, the application management framework 203 determines whether the management unit application to be added is a native application by referring to the package 403 of the management unit application represented by the operation information. More specifically, the application management framework 203 determines whether the management unit application to be added is a native application by referring to the set item 502 depending on the application execution environment in the package 403. When the application management framework 203 has determined that the management unit application to be added is a native application which executes a process directly on the operating system 201, the process advances to step S702. On the other hand, when the application management framework 203 has determined that the management unit application to be added is not a native application, the process advances to step S707.

In step S702, the application management framework 203 extracts the package 403 included in the management unit application to be added. In step S703, the package management system 302 determines whether it is possible to solve the dependence relationship of the package 403 (package to be added) extracted by the application management framework 203 in step S702. That is, if the package to be added requires another package, the package management system 302 confirms, using the package dependence relationship DB 301, whether the necessary package exists. When the package management system 302 has determined that the dependence relationship of the package to be added is soluble (independent), the process advances to step S705. Upon determining that the dependence relationship cannot be solved, the process advances to step S704. Note that in accordance with a request from the application management framework 203, the package management system 302 on the operating system 201 determines whether the dependence relationship of the package to be added is soluble. The package management system 302 notifies the application management framework 203 whether it is possible to solve the dependence relationship of the package to be added.

In step S704, based on, for example, the determination result (or returned value) of the package management system 302, the application management framework 203 determines that the management unit application addition processing has failed. The application management framework 203 notifies the application management interface 204 of the determination result.

In step S705, the package management system 302 extracts files (e.g., data files) included in the package 403 (or indicated by the package 403) and expands them on the file system. The file system is present on the storage device 13 and is managed by the operating system 201. The package management system 302 also updates the package dependence relationship DB 301 based on information about the added package and its dependence relationship. In step S706, based on, for example, the determination result (or returned value) of the package management system 302, the application management framework 203 determines that the management unit application addition processing has succeeded and ended. The application management framework 203 notifies the application management interface 204 of the determination result.

On the other hand, in step S707, the application management framework 203 determines whether it is possible to solve the dependence relationship between management unit applications. The dependence relationship between management unit applications is a relationship like "a management unit application X uses software modules and resources held by a management unit application Y" managed by the application management framework 203. When the application management framework 203 has determined that the dependence relationship between management unit applications is soluble (independent), the process advances to step S708. Upon determining that the dependence relationship cannot be solved, the process advances to step S704.

In step S708, the application management framework 203 expands necessary files (class files and data files) and updates the dependence relationship information of the added management unit application.

Figure 7:
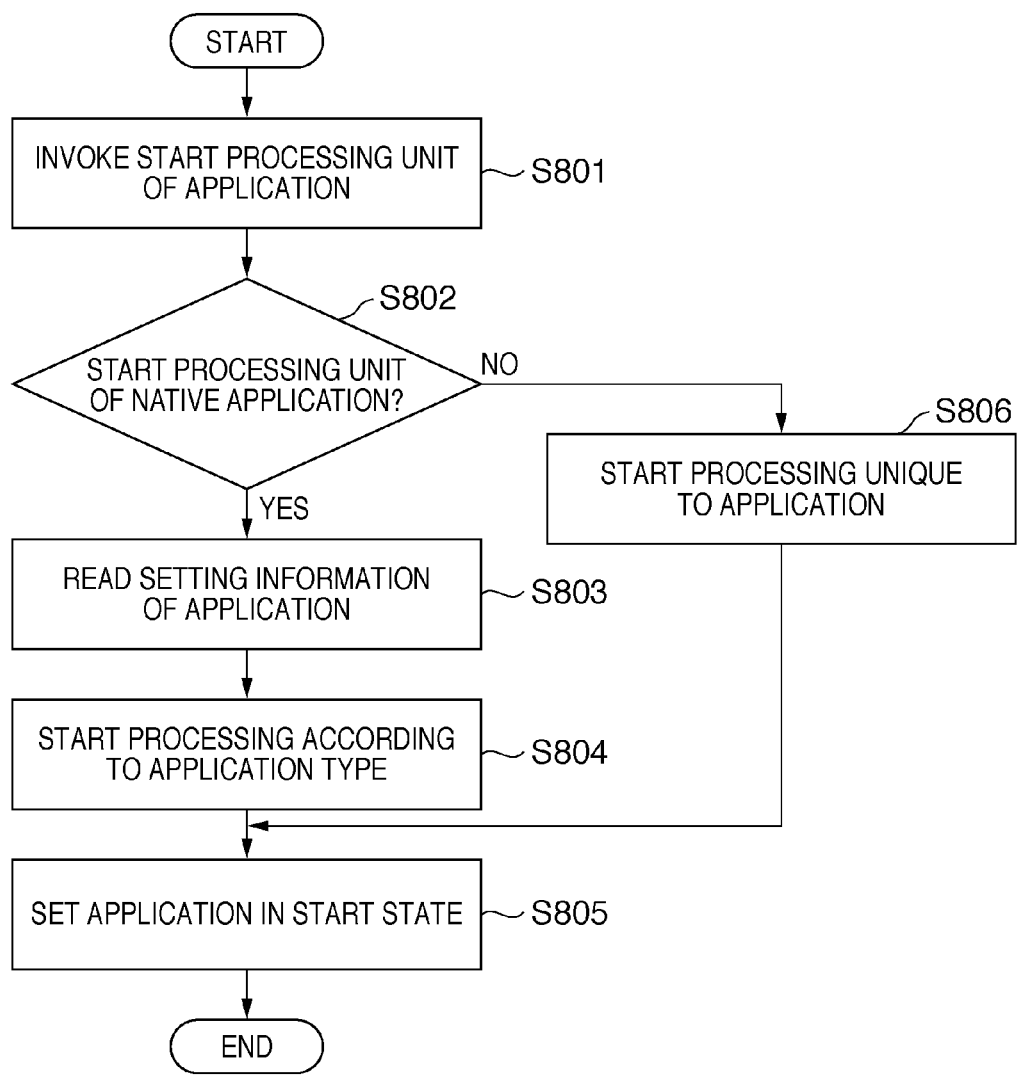
FIG. 7 is a flowchart illustrating an example of management unit application start processing.

FIG. 7 is a flowchart illustrating an example of the management unit application start processing 604 in FIG. 5. If operation information input from the application management interface 204 concerns the start of an application, the application management framework 203 executes the following processing.

In step S801, the application management framework 203 invokes the start/stop processing unit 401 of the management unit application represented by the operation information input from the application management interface 204.

In step S802, the application management framework 203 determines, based on, for example, the package 403, whether the invoked start/stop processing unit 401 is the start/stop processing unit 401 of a native application. When the application management framework 203 has determined that the start/stop processing unit 401 is the start/stop processing unit 401 of a native application, the process advances to step S803. Upon determining that the start/stop processing unit 401 is not the start/stop processing unit 401 of a native application, the process advances to step S806.

In step S803, the application management framework 203 reads the setting information of the application described in, for example, the package 403. In step S804, based on, for example, the read setting information, the application management framework 203 executes unique start processing according to the type of the native application. More specifically, the application management framework 203 transmits a start instruction to the management unit application 205 to operate the start/stop processing unit 401 and controls to execute unique start processing according to the type of the native application.

The unique start processing according to the type of the native application indicates, for example, executing an executable file as a process. As the start/stop processing unit 401 in a management unit application, a native application can prepare the start/stop processing unit 401 predetermined according to the type, as described above. The application management framework 203 uses the prepared start/stop processing unit 401.

On the other hand, in step S806, the application management framework 203 executes start processing unique to the application. The start processing unique to the application indicates start processing unique to an arbitrary application described by the start/stop processing unit 401 in the management unit application.

In step S805, the application management framework 203 sets the management unit application in the start state.

FIG. 8 is a flowchart illustrating an example of the management unit application stop processing 605 in FIG. 5. If operation information input from the application management interface 204 concerns the start of an application, the application management framework 203 executes the following processing.

In step S901, the application management framework 203 invokes the start/stop processing unit 401 of the management unit application represented by the operation information input from the application management interface 204.

In step S902, the application management framework 203 determines, based on, for example, the package 403, whether the invoked start/stop processing unit 401 is the stop processing unit 401 of a native application. When the application management framework 203 has determined that the start/stop processing unit 401 is the start/stop processing unit 401 of a native application, the process advances to step S903. Upon determining that the start/stop processing unit 401 is not the start/stop processing unit 401 of a native application, the process advances to step S905.

In step S903, the application management framework 203 executes unique stop processing according to the type of the native application. More specifically, the application management framework 203 transmits a stop instruction to the management unit application to operate the start/stop processing unit 401 (stop unit) and controls to execute unique stop processing according to the type of the native application.

On the other hand, in step S905, the application management framework 203 executes stop processing unique to the application.

In step S904, the application management framework 203 sets the management unit application in the stop state.

Figure 9:
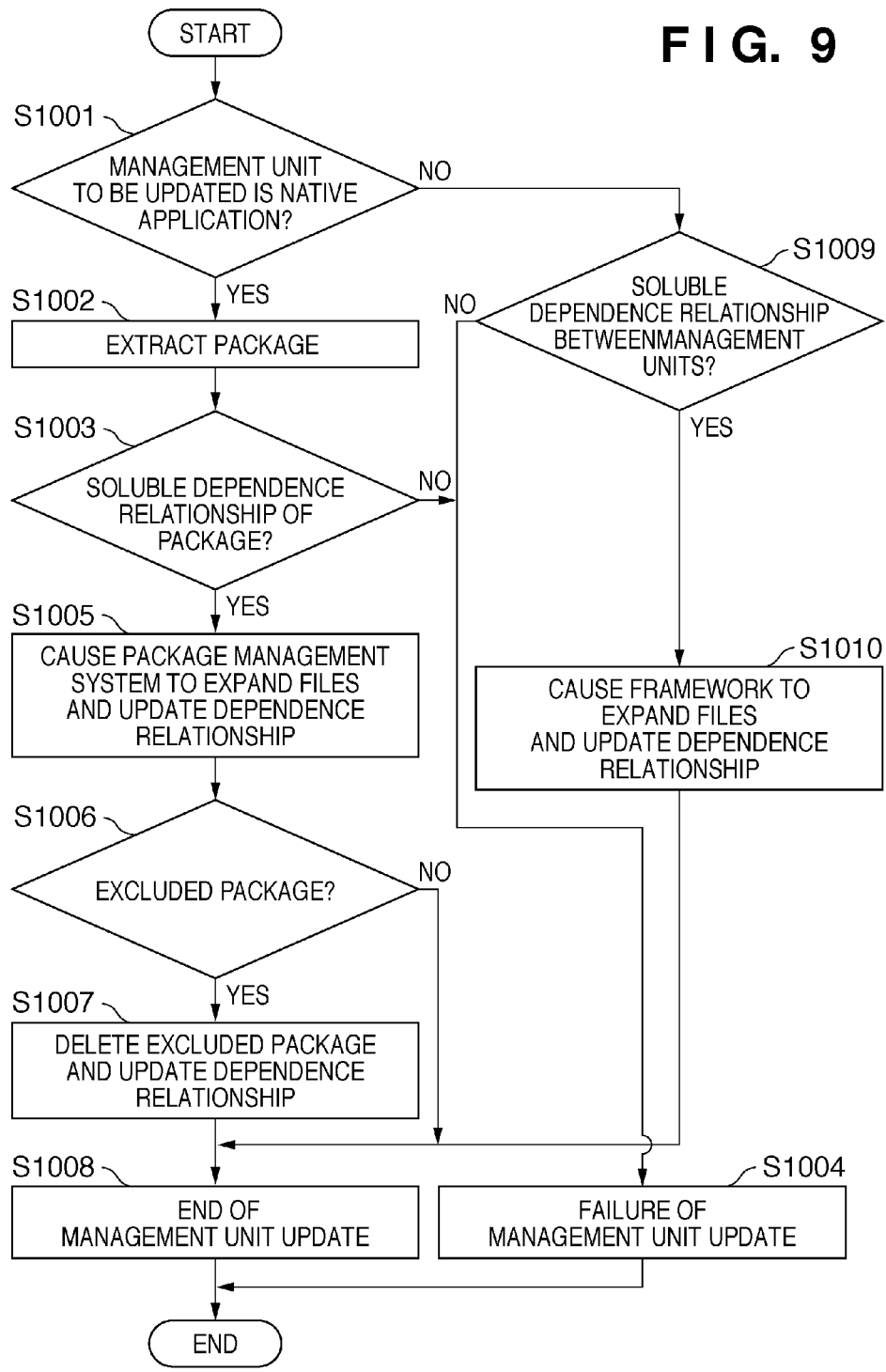
FIG. 9 is a flowchart illustrating an example of management unit application update processing.

FIG. 9 is a flowchart illustrating an example of the management unit application update processing 603 in FIG. 5. If operation information input from the application management interface 204 concerns the update of an application, the application management framework 203 on the execution environment 202 executes the following processing.

Note that the update processing is the same as the addition processing shown in FIG. 6 except that processes in steps S1006 and S1007 are added, and only the processes in steps S1006 and S1007 will be explained.

In step S1006, the package management system 302 on the operating system 201 determines, using the package dependence relationship DB 301, whether a package which has newly been excluded upon updating the management unit application exists. When the package management system 302 determines that there is a package which has newly been excluded, the process advances to step S1007. Upon determining that there is no package which has newly been excluded, the process advances to step S1008.

In step S1007, based on information about the updated management unit application and its dependence relationship, the package management system 302 on the operating system 201 deletes the package which has newly been excluded. The package management system 302 also updates the package dependence relationship DB 301 so as to update information about the dependence relationship based on the information about the updated management unit application and its dependence relationship.

Figure 10:
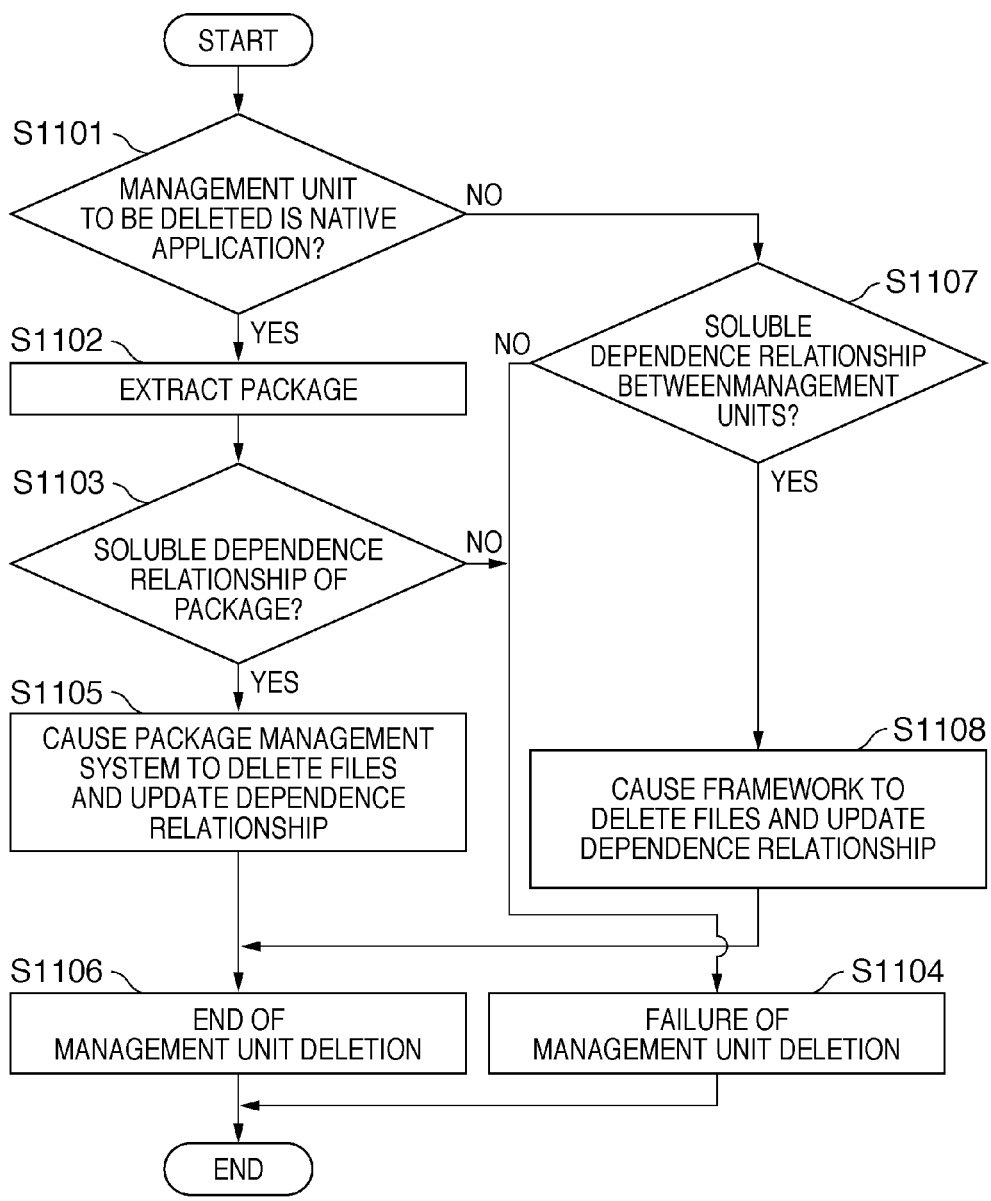
FIG. 10 is a flowchart illustrating an example of management unit application deletion processing.

FIG. 10 is a flowchart illustrating an example of the management unit application deletion processing 602 in FIG. 5. If operation information input from the application management interface 204 concerns deletion of an application, the application management framework 203 on the execution environment 202 executes the following processing.

In step S1101, the application management framework 203 determines whether the management unit application to be deleted is a native application by referring to the package 403 of the management unit application represented by the operation information. More specifically, the application management framework 203 determines whether the management unit application to be deleted is a native application by referring to the set item 502 depending on the application execution environment in the package 403. When the application management framework 203 has determined that the management unit application to be deleted is a native application, the process advances to step S1102. Upon determining that the management unit application is not a native application, the process advances to step S1107.

In step S1102, the application management framework 203 extracts the package 403 included in the management unit application to be deleted. In step S1103, the package management system 302 determines whether the dependence relationship of the package 403 (package to be deleted) extracted by the application management framework 203 in step S1102 has a problem. That is, the package management system 302 on the operating system 201 confirms, using the package dependence relationship DB 301, whether the package to be deleted is required by another package. When the package management system 302 has determined that the dependence relationship of the package to be deleted is soluble, the process advances to step S1105. Upon determining that the dependence relationship cannot be solved, the process advances to step S1104.

In step S1104, based on, e.g., the determination result (or returned value) of the package management system 302, the application management framework 203 determines that the management unit application deletion processing has failed. The application management framework 203 notifies the application management interface 204 of the failure of the deletion processing.

In step S1105, the package management system 302 deletes, from the file system, files included in the package 403 and updates the package dependence relationship DB 301 based on information about the deleted package and its dependence relationship. In step S1106, based on, for example, the determination result (or returned value) of the package management system 302, the application management framework 203 determines that the management unit application deletion processing has succeeded and ended.

On the other hand, in step S1107, the application management framework 203 determines whether it is possible to solve the dependence relationship between management unit applications. When the application management framework 203 has determined that the dependence relationship between management unit applications is soluble, the process advances to step S1108. Upon determining that the dependence relationship cannot be solved, the process advances to step S1104.

In step S1108, the application management framework 203 deletes files and updates the dependence relationship information of the deleted management unit application.

The arrangement and processing procedure of the application management system have been described above. More detailed operation states of the application management system will be explained next.

Figure 11:
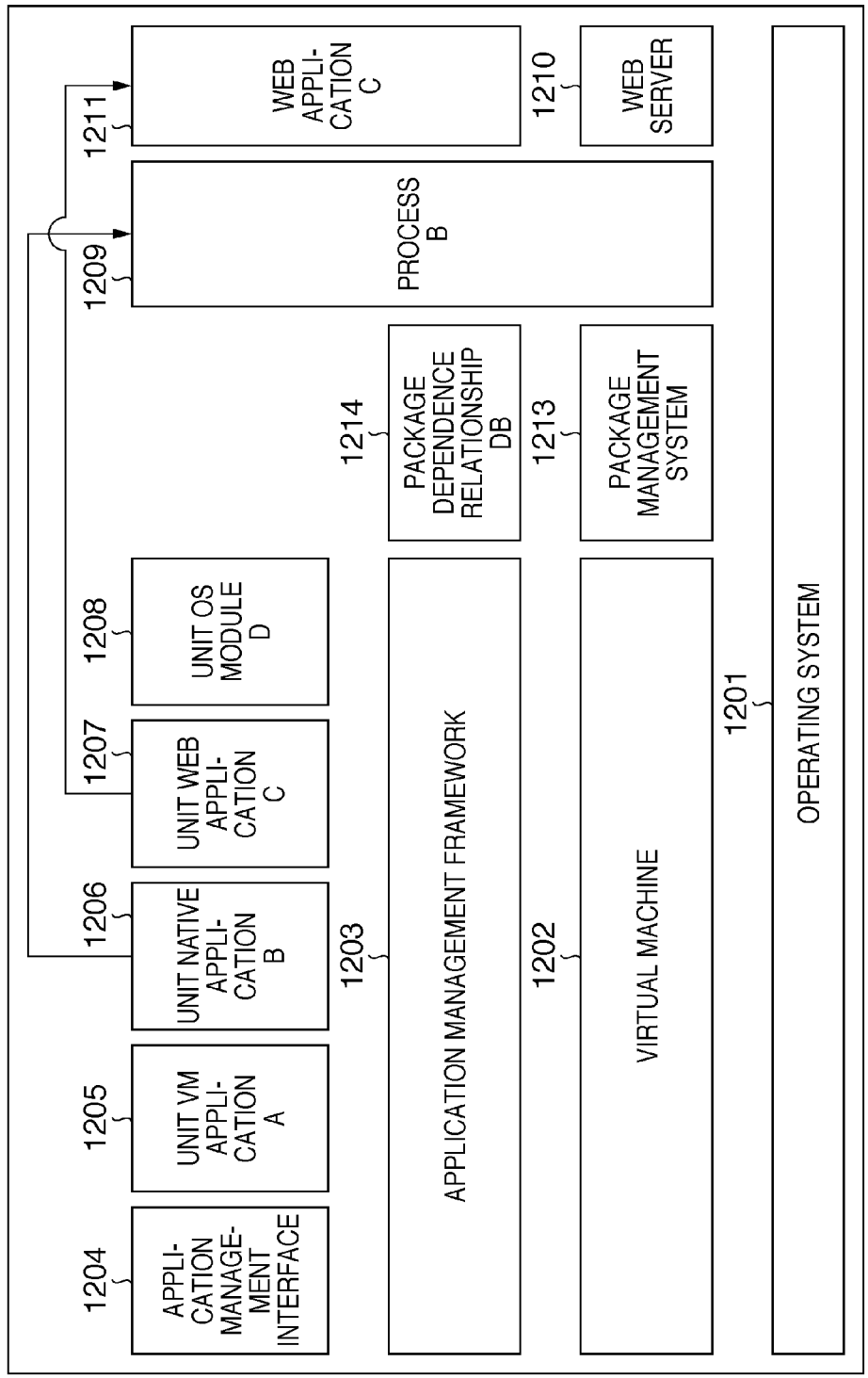
FIG. 11 is a view showing an example of the operation state of the application management system.

FIG. 11 is a view showing an example of the operation state of the application management system.

As shown in FIG. 11, a virtual machine 1202 serving as an execution environment runs on an operating system 1201. An application management framework 1203 runs on the virtual machine 1202. On the application management framework 1203, management unit applications to be described below are added and managed.

An application management interface 1204 is an application which allows the user to unify management of management unit applications on the system even if they run on different execution environments.

A unit VM application A 1205 is a management unit application which runs on the virtual machine 1202 using the virtual machine 1202 as an execution environment. A unit native application B 1206 is a management unit application which runs as a process 1209 using the operating system 1201 as a direct execution environment.

A unit Web application C 1207 is a management unit application which runs as a Web application C 1211 using a Web application server 1210 as an execution environment. A unit operating system (OS) module D 1208 as a management unit application is a management unit module which is not directly executed but only expanded on the file system as an operating system expansion module.

An application window displayed by the application management interface 1204 will be described next. In an application operation window, a display area unique to each application and a display area of buttons and the like to switch the application display area are arranged. An application selected by pressing a button to switch the application display area is displayed in the display area unique to the application.

The buttons to switch the application display area include a button to switch to a native application and a button to switch to an application on the virtual machine. The user can switch the application display without awareness of the difference in execution environment by pressing each button.

An application management interface window displayed by the application management interface 1204 will be explained next. In an application management interface operation window (operation window), information such as the name and state of each added management unit application is arranged. For example, information representing that a VM application is in the added state and a native application is in the running state is arranged. Additionally, buttons to change the state of each management unit application are arranged in the application management interface operation window.

The buttons to change the state include a button to start a management unit application, a button to stop a management unit application, a button to add a management unit application, and a button to delete a management unit application. The user can systematically manage applications on different execution environments by selecting one of the management unit applications displayed in the application management interface window and pressing a button to change the state.

Note that the application window and the application management interface window are managed by the application management interface 1204, and information input (or selected) via the window is input (or sent) to the application management framework 1203.

That is, the application management interface 1204 on the application management framework 1203 receives a state change request for an application via the application management interface window. Upon receiving the change request, the application management interface 1204 inputs operation information corresponding to the change request to the application management framework 1203 on the virtual machine 1202. As described above, the change requests include an application start request, stop request, addition request, and deletion request. As described above, if the target of the change request is a native application, a package management system 1213 determines whether the dependence relationship of the package can be solved. If the dependence relationship is soluble, processing corresponding to the request is executed.

The object of the present invention is also achieved by the following method. A storage medium (or recording medium) which records software program codes to implement the functions of the above-described embodiment is supplied to a system or apparatus. The central processing unit (CPU or MPU) of the system or apparatus reads out and executes the program codes stored in the storage medium. In this case, the program codes read out from the storage medium themselves implement the functions of the above-described embodiment. The storage medium that records the program codes constitutes the present invention.

When the central processing unit of the system or apparatus executes the readout program codes, the operating system (OS) running on the system or apparatus partially or wholly executes actual processing based on the instructions of the program codes. The present invention also incorporates a case in which the functions of the above-described embodiment are implemented by the processing.

Assume that the program codes read out from the storage medium are written in the memory of a function expansion card inserted into the system or apparatus or a function expansion unit connected to the system or apparatus. After that, the CPU of the function expansion card or function expansion unit partially or wholly executes actual processing based on the instructions of the program codes. The present invention also incorporates a case in which the functions of the above-described embodiment are implemented by the processing.

When the present invention is applied to the storage medium, the storage medium stores program codes corresponding to the above-described flowcharts.

According to the above-described embodiment, it is possible to systematically manage the operation states of applications without awareness of the execution environments of the applications.

A preferred embodiment of the present invention has been described above in detail. The present invention is not limited to the specific embodiment, and various changes and modifications can be made within the spirit and scope of the present invention described in the appended claims.

The present invention is not limited to the above-described embodiment and various changes and modifications can be made within the spirit and scope of the present invention. Therefore, to apprise the public of the scope of the present invention, the following claims are made.

This application claims the benefit of Japanese Patent Application No. 2007-149558, filed Jun. 5, 2007, which is hereby incorporated by reference herein in its entirety.

The invention claimed is:

1. An application management method in an information processing apparatus, which includes a package management system that is executed on an operating system, an execution environment that is executed on the operating system, and an application management framework that operates on the execution environment and manages a state of an application, the method comprising steps of:

determining, in accordance with whether or not the application is executed on the operating system, whether the package management system manages a dependence relationship between a package of the application and another package, or the application management framework manages a dependence relationship between the application and another application; and managing, by the package management system, the dependence relationship between the packages, or managing, by the application management framework, the dependence relationship between the applications, in accordance with a determination made in the determining step, wherein each of the packages is a group of files to be used to execute a corresponding application, wherein the application includes a set item dependent on the execution environment of the application and a set item independent from the execution environment of the application, wherein whether the package management system manages the dependence relationship between the packages or the application management framework manages the dependence relationship between the applications is determined in accordance with the set item dependent on the execution environment of the application, and wherein at least one of the determining step and the managing step is performed by a central processing unit operating in conjunction with a memory device.

2. The application management method according to claim 1, further comprising a step of expanding files included in a package of the application upon determining that the dependence relationship is soluble.

3. The application management method according to claim 1, wherein the application includes a start unit that executes start processing, and the method further comprises a step of executing the start processing of the application by the application management framework.

4. The application management method according to claim 1, wherein the application includes a stop unit that executes stop processing, and the method further comprises a step of executing the stop processing of the application by the application management framework.

5. The application management method according to claim 1, wherein the application runs on the application management framework.

6. The application management method according to claim 1, further comprising a step of executing the application as a process different from a process of the application management framework.

7. An information processing apparatus comprising:

a central processing unit coupled to a memory device;

a package management system that is executed on an operating system and that manages a dependence relationship between a package of an application and another package, wherein each of the packages is a group of files to be used to execute a corresponding application; and an application management framework that operates on an execution environment and is executed on the operating system, manages a state of the application, and determines, in accordance with whether or not the application is executed on the operating system, whether the package management system manages a dependence relationship between a package of the application and another package, or whether the application management framework manages a dependence relationship between the application and another application, wherein the dependence relationship between the packages is managed by the package management system, or the dependence relationship between the applications is managed by the application management framework, in accordance with a determination by the application management framework, wherein operation of at least one of the package management system and the application management framework is controlled by the central processing unit operating in conjunction with the memory device, wherein the application includes a set item dependent on the execution environment of the application and a set item independent from the execution environment of the application, and wherein whether the package management system manages the dependence relationship between the packages or the application management framework manages the dependence relationship between the applications is determined in accordance with the set item dependent on the execution environment of the application.

8. The information processing apparatus according to claim 7, wherein the application management framework or the package management system expands files included in a package of the application upon a determination by the application management framework that the dependence relationship is soluble.

9. The information processing apparatus according to claim 7, wherein the application includes a start unit that executes start processing of the application, and the application management framework controls to cause the start unit to execute the start processing of the application.

10. The information processing apparatus according to claim 7, wherein the application includes a stop unit that executes stop processing of the application, and the application management framework controls to cause the stop unit to execute the stop processing of the application.

11. The information processing apparatus according to claim 7, wherein the application runs on the application management framework.

12. The information processing apparatus according to claim 7, wherein the application is executed as a process different from a process of the application management framework.

13. A non-transitory computer-readable storage medium storing, in executable form, a program for causing a computer to perform an application management method in an information processing apparatus, which includes a package management system that is executed on an operating system, an execution environment that is executed on the operating system, and an application management framework that operates on an execution environment and manages a state of an application, the method comprising steps of:

determining, in accordance with whether or not the application is executed on the operating system, whether the package management system manages a dependence relationship between a package of the application and another package of another application, or the application management framework manages a dependence relationship between the application and another application; and managing, by the package management system, the dependence relationship between the packages, or managing by the application management framework, the dependence relationship between the applications, in accordance with a determination in the determining step, wherein each of the packages is a group of files to be used to execute a corresponding application, wherein the application includes a set item dependent on the execution environment of the application and a set item independent from the execution environment of the application, and wherein whether the package management system manages the dependence relationship between the packages or the application management framework manages the dependence relationship between the applications is determined in accordance with the set item dependent on the execution environment of the application.

\* \* \* \* \*